United States Patent  (10) Patent No.: US 6,188,854 B1
Coleman et al.  (45) Date of Patent: Feb. 13, 2001

(54) NON-CONTACT THERMAL TEMPERATURE CONTROLLER

(76) Inventors: Tommy C. Coleman, 2504 Cornell Dr., Flower Mound, TX (US) 75022; Rico Lauver, 15889 Preston Dr. #2059, Dallas, TX (US) 75248

( * ) Notice: Under 35 U.S.C. 154(b), the term of this patent shall be extended for 0 days.

(21) Appl. No.: 09/436,581

(22) Filed: Nov. 9, 1999

(51) Int. Cl.[7] .................................................. G03G 15/20
(52) U.S. Cl. ............................... 399/68; 399/69; 219/216
(58) Field of Search .................................... 219/216, 388, 219/469; 399/69, 322, 400, 68; 432/45, 60; 374/153

(56) References Cited

U.S. PATENT DOCUMENTS

| | | | |
|---|---|---|---|
| T100,804 | * | 7/1981 | Ernst ........................................ 355/14 |
| 3,653,263 | * | 4/1972 | Poole et al. ............................. 374/126 |
| 3,697,722 | * | 10/1972 | Furuichi et al. ........................ 219/216 |
| 3,735,092 | * | 5/1973 | Traister ................................... 219/501 |
| 4,104,692 | * | 8/1978 | Sudo et al. .............................. 361/106 |
| 4,318,612 | * | 3/1982 | Brannan et al. .......................... 355/14 |
| 4,319,874 | * | 3/1982 | Sawano ................................... 432/60 |
| 4,362,502 | * | 12/1982 | Motomura et al. ...................... 432/60 |
| 4,373,802 | * | 2/1983 | Yuge et al. ................................ 355/15 |
| 4,425,494 | * | 1/1984 | Enomoto et al. ....................... 219/216 |
| 4,485,294 | * | 11/1984 | Rosenberg .............................. 219/216 |
| 4,541,708 | * | 9/1985 | Shigenobu ................................... 355/3 |
| 4,570,044 | * | 2/1986 | Kobayashi et al. ................. 219/10.49 |
| 4,585,325 | * | 4/1986 | Euler ........................................ 399/69 |
| 4,897,692 | * | 1/1990 | Karz ......................................... 399/33 |
| 4,968,872 | * | 11/1990 | Kasumoto .............................. 219/497 |
| 5,019,693 | * | 5/1991 | Tamary ................................... 219/471 |
| 5,032,874 | * | 7/1991 | Matsuuchi .............................. 355/285 |
| 5,170,215 | * | 12/1992 | Pfeuffer .................................. 355/285 |
| 5,262,618 | * | 11/1993 | Thelen .................................... 219/486 |
| 5,321,481 | * | 6/1994 | Mathers ................................. 355/290 |
| 5,386,272 | * | 1/1995 | Nakazato ............................... 355/207 |
| 5,502,546 | * | 3/1996 | Muto ...................................... 355/208 |
| 5,548,378 | * | 8/1996 | Ogata et al. ............................ 355/208 |
| 5,568,229 | * | 10/1996 | Szlucha .................................. 355/208 |
| 5,649,265 | * | 7/1997 | Tabuchi ................................... 399/44 |
| 5,681,494 | * | 10/1997 | Suzuki et al. .......................... 219/497 |
| 5,754,917 | * | 5/1998 | Fromm et al. ........................... 399/33 |

FOREIGN PATENT DOCUMENTS 54-130031 * 10/1979 (JP) .
6-043783 * 2/1994 (JP) .

* cited by examiner

Primary Examiner—Robert Beatty
(74) Attorney, Agent, or Firm—Roberts Abokhair & Mardula, LLC

(57) ABSTRACT

A temperature monitoring and control system interfaces with a host printing system through a communication medium to allow the host printing system to maintain control of heating lamps used to heat hot roll (fuser roll) to the required temperature. The temperature monitoring circuitry calibrates itself via the use of a black body calibration strip applied to the hot roller. The black body strip is used to determine the temperature and thus provide offset values for the hot roll cylinder, with respect to the thermal conductive coating. Temperature measurement according to the present invention utilizes infrared technology thermal sensors in conjunction with self-compensating controlling circuitry. The actual temperature of the coated surface is measured and compensated for by the use of Boolean algebraic logic as the hot roll cylinder is heated and during the course of the printing operation. This control device provides the advantage of a non-contact temperature controlling device, is that it offers a selection of specific temperatures in varying increments, which allows for different hot roll heating for different paper and other print media. This adjustment further allows for temperature adjustments to compensate for extremes and/or variations of moisture content of the print medium. Another advantage of the control device is that it adaptively controls based on the rotational speed of the hot roll.

19 Claims, 15 Drawing Sheets

NON-CONTACT THERMAL TEMPERATURE CONTROLLER

BACKGROUND OF THE INVENTION

1. Field of the Invention

The present invention relates generally to electrophotographic image forming equipment. More particularly, the present invention relates to a method of controlling the temperature of a cylinder used in the printing process for fixing a toner image.

2. Background Information

In most electrophotographic printing applications, the need exists for precision temperature control for maintaining adequate fusing roll temperature for the fusing of toner to a medium which is typically paper.

In most situations, the hot roller (or "fusing roll") is heated to a particular temperature at which it allows fusing of a toner to a medium. This temperature must be precisely controlled since, if the roller is too hot, the medium can be burned, or if the temperature is too cool, the toner will not adhere to the medium resulting in the image or words being smeared on the paper. Further, the temperature at which the hot roller must be kept varies with both the media on which information is printed and the characteristics of the toner. Typically, temperature is determined by a contact thermometer or thermocouple of some type in direct contact with the hot roll.

Current methods for controlling the temperature of a heated cylinder or roll are through the use of a ferrite chip that is charged with a magnetic field. The magnetic flux is then measured through a sensor, resulting in the generation of a pulse used to determine the cylinder's temperature. The ferrite chip fails to accept magnetic charge value when the optimum temperature is achieved, thus signaling the electronics of the printer that the required temperature has been reached since a pulse was not generated.

Another method of measuring cylinder temperature is through the use of contact thermal sensors and thermal fuses. These contact sensors measure the temperature of the heated roller through a heat transfer process dictated by positive contact with the surface of the hot roller.

What is needed is a non-contact temperature controlling device that can determine the ambient air temperature of a printer fixing or fusing device, measure the reflectance of a heated roller, and measure the temperature of a thermal coating applied to the heated roller used in the fixing of toner on a printed media. What is also needed is a non-contact temperature controlling device that is adjustable based upon media and toner characteristics and that is amenable to use by a layman operator of the printing system without special equipment or other specialized knowledge.

SUMMARY OF THE INVENTION

It is therefore an object of the present invention to provide for non-contact temperature control of fusing rollers in the electrophotographic process.

It is another object of the present invention to provide a non-contact temperature controlling device that can determine the ambient air temperature of a printer fixing or fusing device, measure the reflectance of a heated cylindrical roller, and measure the temperature of a thermal coating applied to a cylinder used in the fixing of toner on a printed media.

It is a further object of the present invention to provide for specific temperature adjustments to account for variations in moisture content of the print media being used.

It is yet another object of the present invention to provide for specific temperature adjustments to account for variations in characteristics of the toner and the print media being used.

The present invention is a device used for controlling the temperature of a hot roll cylinder used in the printing process. During the process of heating a cylinder for the purpose of fixing a toner image in an electrophotographic printing system (termed a hot roller, hot roll, or fusing roll), the print media which is in contact with the heated roll removes some of the applied heat, thus causing the hot roll to cool and thereby degrade the performance of the hot roll. It is therefore critical that the hot roll maintain its required temperature in order for subsequent prints to have the toner appropriately fused to the print media. The present invention not only monitors the temperature of the hot roller but corrects the operating temperature to within a prescribed parameter associated with the print media being used.

A temperature monitoring and control subsystem according to the present invention interfaces with the host printing system through a communication medium to allow the host printing system to maintain control of the heating lamps used to heat the hot roll to the required temperature based upon input from the present invention.

The temperature monitoring circuitry according to the present invention calibrates itself via the use of a black body calibration strip applied to the hot roller. This black body strip is used to determine the temperature and thus provide offset values for the hot roll cylinder to the thermal conductive coating. The black body calibration surface comprises a non-expansive material capable of tolerating the maximum heat applied to the hot roll cylinder without losing its non-reflectance (emissive) properties.

Temperature measurement according to the present invention utilizes infrared technology thermal sensors in conjunction with self-compensating controlling circuitry. The actual temperature of the coated surface is measured and compensated for by the use of Boolean algebraic logic as the hot roll cylinder is heated and during the course of the printing operation.

An advantage of such a controlling device, that is, a non-contact temperature controlling device, is that it offers a selection of specific temperatures in varying increments, which allows for different hot roll heating for different paper and other print media. This adjustment further allows for temperature adjustments to compensate for extremes and/or variations of moisture content of the print medium.

BRIEF DESCRIPTION OF THE DRAWINGS

Additional features and advantages of the present invention can more particularly be determined from the detailed description, read in conjunction with the drawing figures, wherein.

DETAILED DESCRIPTION OF THE INVENTION

The present invention is a temperature measurement and controlling system for measuring the non-contact temperature of a fusing roller and controlling a heating mechanism for the fusing roller. The present invention is useful in combination (either as a post-factory retrofit, or as original equipment from the manufacturer) with a wide variety of printing and electrophotographic systems. For example, the following machines can benefit from more precise temperature control offered by the present invention: Hitachi type and model LB16 PA and LB16 NC; IBM 3900 printer family and the IBM Infoprint family; Siemens NDY, NDX, and NDZ families, Siemens Nixdorf NDY, NDX, and NDZ families, Siemens Nixdorf /OCE NDY, NDX, and NDZ; and Pagestream family of printers.

In this application the terms the term "hot roll" or "hot roller" is used consistently, although in common usage I the art the hot roll structure is variously referred to by skilled artisans as "fixing roller," "fuser roll," "fusing roller," and "heated cylinder." All these terms are used synonymously to mean the heated item used for fixing the toner to the print medium. The print media in this case are typically paper, vinyl or plastic.

Figure 1:
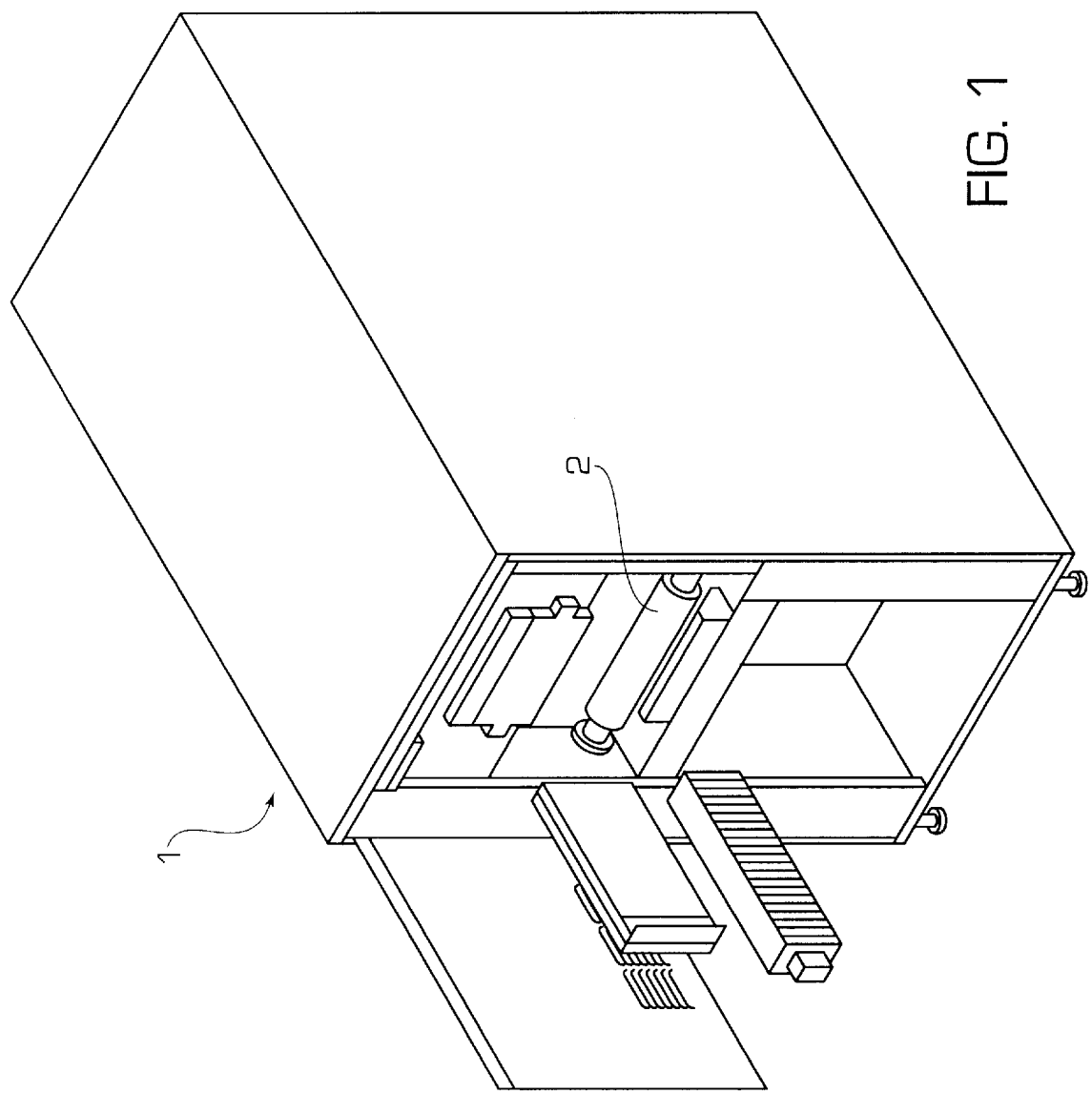
FIG. 1 illustrates, in a general way, how the present invention interrelates with a conventional printer.

The controlling device of the present invention is a temperature measurement and controlling system for use in an electrophotographic printer 1 (refer to FIG. 1). During the course of printing, a hot roll 2 fixes the toner image to the print media. The problem is that the print media itself removes some of the heat from the hot roller 2, thus causing a gradual deterioration in the performance of the hot roll 2 required to fuse the toner to the print media. The present invention measures the temperature and provides a controlling circuit to correct the operating temperature of the hot roller 2 to within the appropriate predetermined parameters associated with the print media being used.

A temperature control knob is provided according to the present invention for a user to select a desired operating temperature of the hot roll, and a liquid crystal display is provided to display the actual temperature of the hot roll. An alarm feature provides an audible tone in the event that an over-temperature condition is achieved. In this way, corrective action can be taken by the user to avoid potential damage to the hot roll or to avoid potential damage to the print media.

Figure 2:
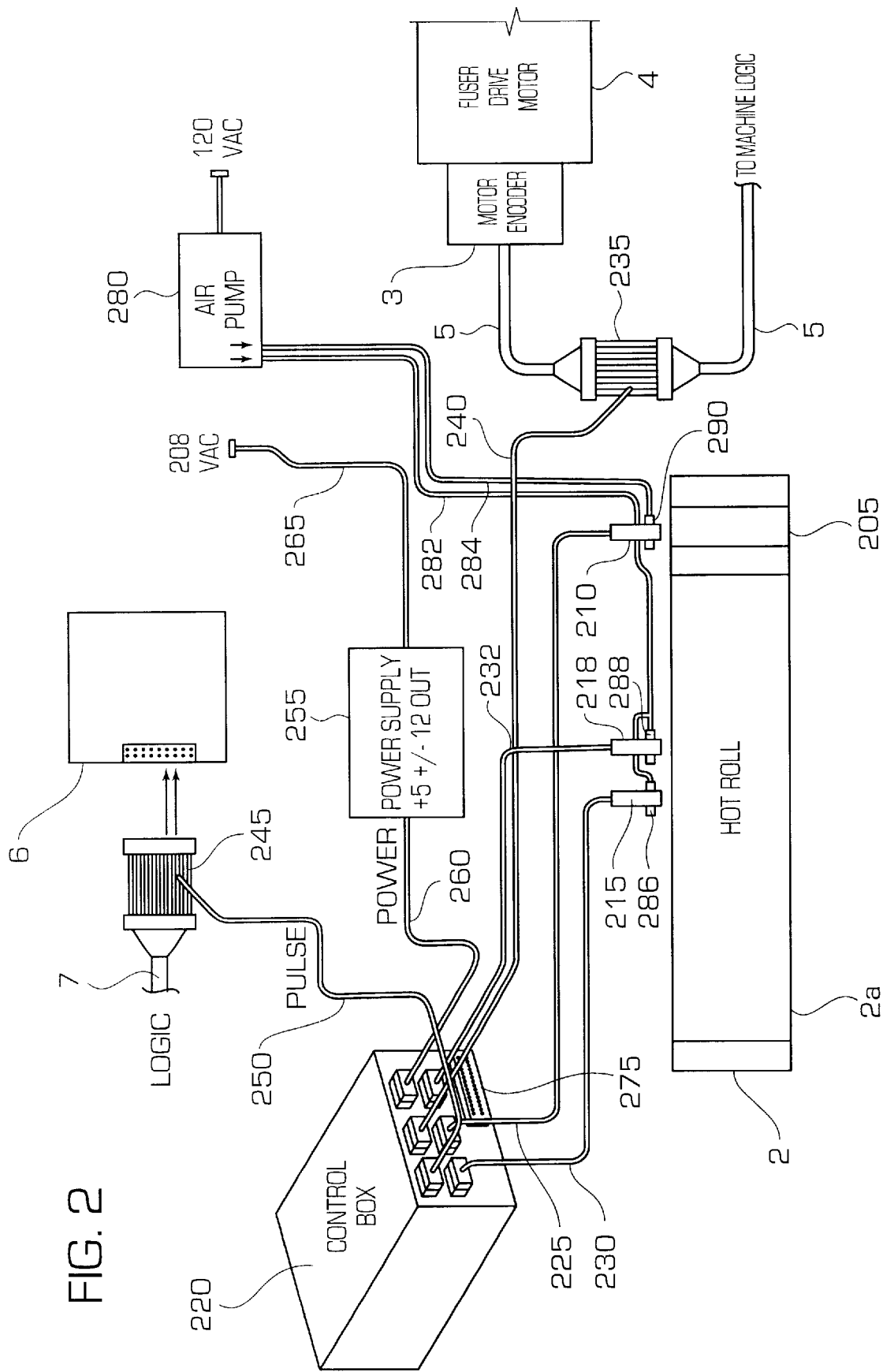
FIG. 2 illustrates how an embodiment of the present invention interrelates with cabling of a conventional printer.

Referring to FIG. 2, the subassembly components comprising the sensing and control circuitry for the present invention are shown. The hot roller 2 is shown with the black body band 205 (the emissive reference) which is to be heated and controlled by the present invention. Mounting brackets (not shown) are used to position three thermal sensors 210, 215, 218 adjacent the hot roll 2. A first, band detect sensor 210 is positioned for reference calibration on the non-reflective (emissive) band 205 of the hot roll 2. A second, control sensor 215 is positioned to sense the temperature on the working portion 2a of the hot roll 2. A third, display sensor 218 is positioned to verify calibrations of the reported temperature as resulting from the first and second sensors 210, 215. The sensors 210, 215, 218 are preferably non-contact infrared sensors, and are collectively used to perform detection and calibration functions.

A control box 220 contains a controller circuit board that is connected to the sensors 210, 215, 218 by respective cables 225, 230, 232. In this fashion, the controller circuit board can sense and adjust for any bias in the infrared sensors 210, 215, 218.

Figure 3:
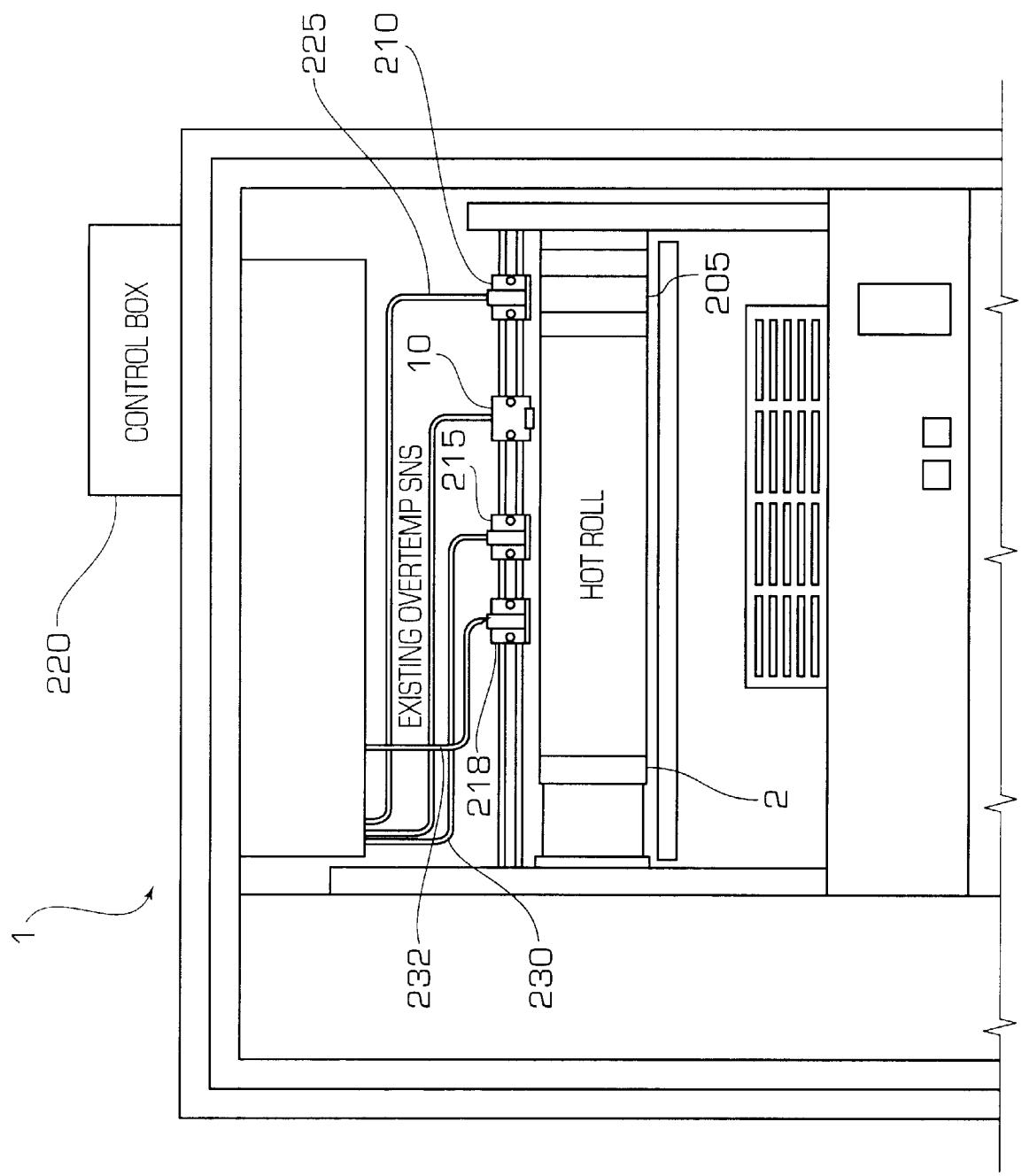
FIG. 3 illustrates how sensors according to the present invention interrelate to a hot roll structure of a conventional printer.

Referring to FIG. 3, a view is shown of how the three sensors 210, 215, 218 according to an embodiment of the present invention are installed in a printer 1 so as to flank a conventional (existing) over-temperature sensor 10.

Referring to FIG. 2, the control box 220 interfaces with the motor encoder 3 to determine the idle (non-printing) speed and the operating (printing) speed of the hot roll, which is driven by the fuser drive motor 4. Encoding data is provided to the control box 220 via a signal cable 240 that taps into the cabling harness 5 of the motor encoder 3 by way of an adapter 235.

The control box 220 interfaces with the lamp power board 6, which controls the heat lamps (not shown) used to heat the hot roll 2. Lamp control pulses are transmitted from the control box 220 to the lamp power board 6 via signal cable 250. The signal cable 250 is coupled to the lamp power board via an adapter 245 interposed between the wiring harness 7 and the lamp power board 6.

Figure 4:
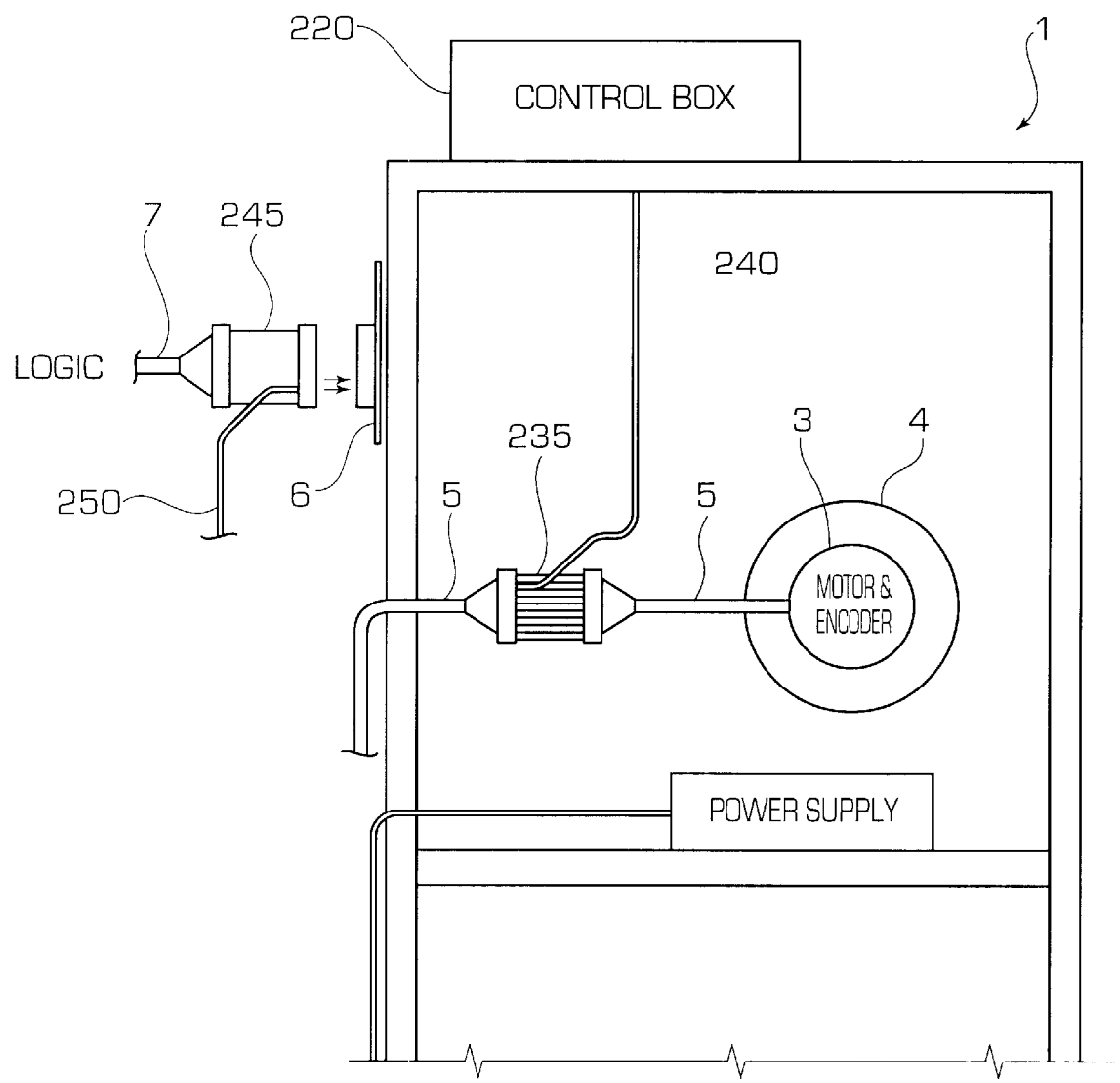
FIG. 4 illustrates how in-line connector adapters are used to connect a controller according to the present invention with control cables of a conventional printer.

Referring to FIG. 4, a view is shown of how the adapter 235 and signal cable 240 according to an embodiment of the present invention are installed in a printer so as to tap into the wiring harness 5 of the motor encoder 3. The adapter 245 is shown coupling the signal cable 250 into the interface between the wiring harness 7 and the lamp power board 6.

Figure 5:
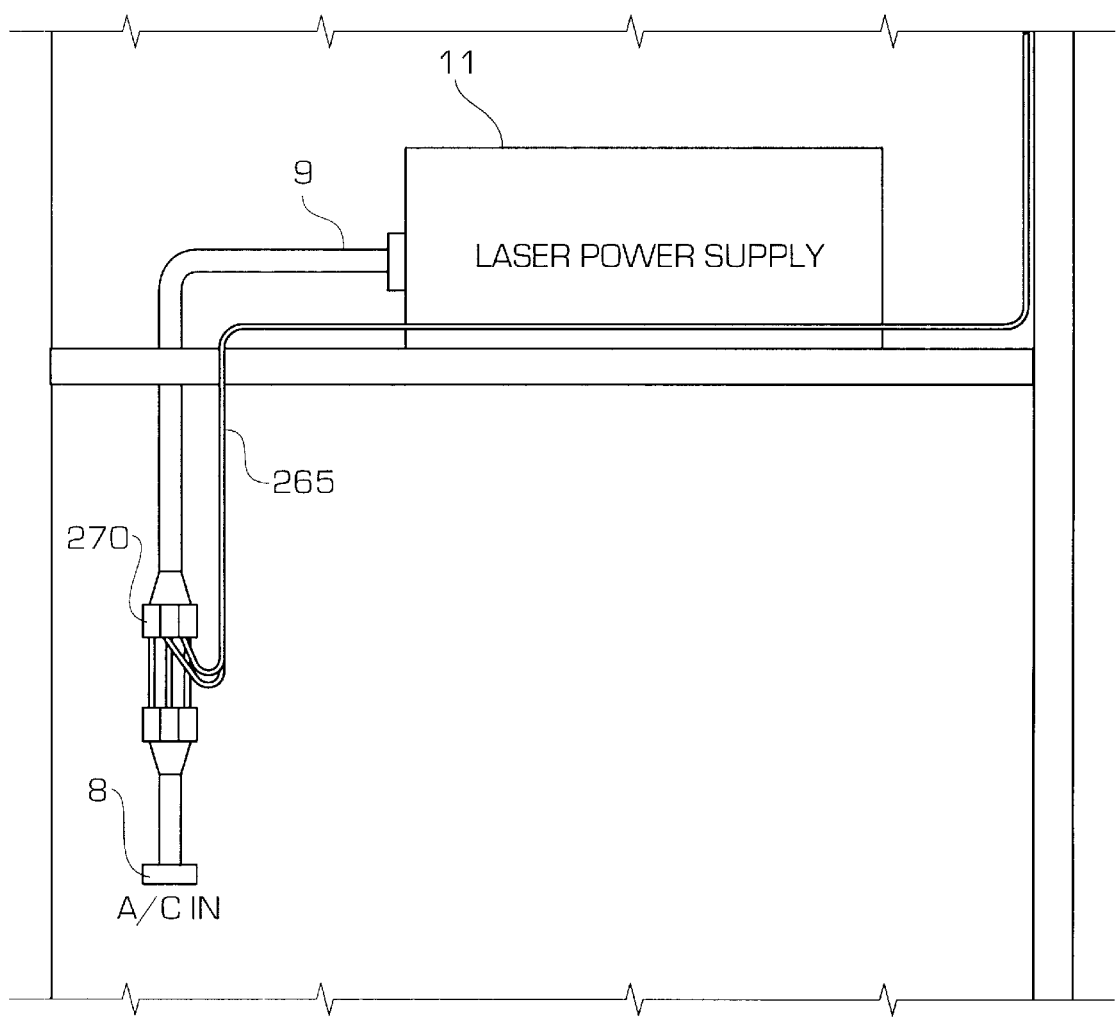
FIG. 5 illustrates how an in-line connector adapter is used to tap into a power cable of a conventional printer to provide power to a controller according to the present invention.

Referring to FIG. 2, the control box 220 is powered by a controller power supply 255, which provides +5VDC and ±12VDC via power cable 260. The power supply 255 taps into the main power cable 9 to receive 280 VAC input power. This arrangement is shown in situ in FIG. 5.

An external calibration and test fixture (not shown) is optionally used to verify and recalibrate the system in case of a thermal sensor failure or in the event that new sensor technologies may be applied. Such an external subsystem is connectable to the control box 220 via the port 275.

An air pump 280 is powered via tapping into the 120 VAC supply cable. The air pump 280 provides air flow via air hoses 282, 284 to output adapters 286, 288, 290. The air flow output at the output adapters 286, 288, 290 functions to cool the IR sensors 215, 218, 210 and purges contamination that may accumulate on the IR sensors.

Figure 6:
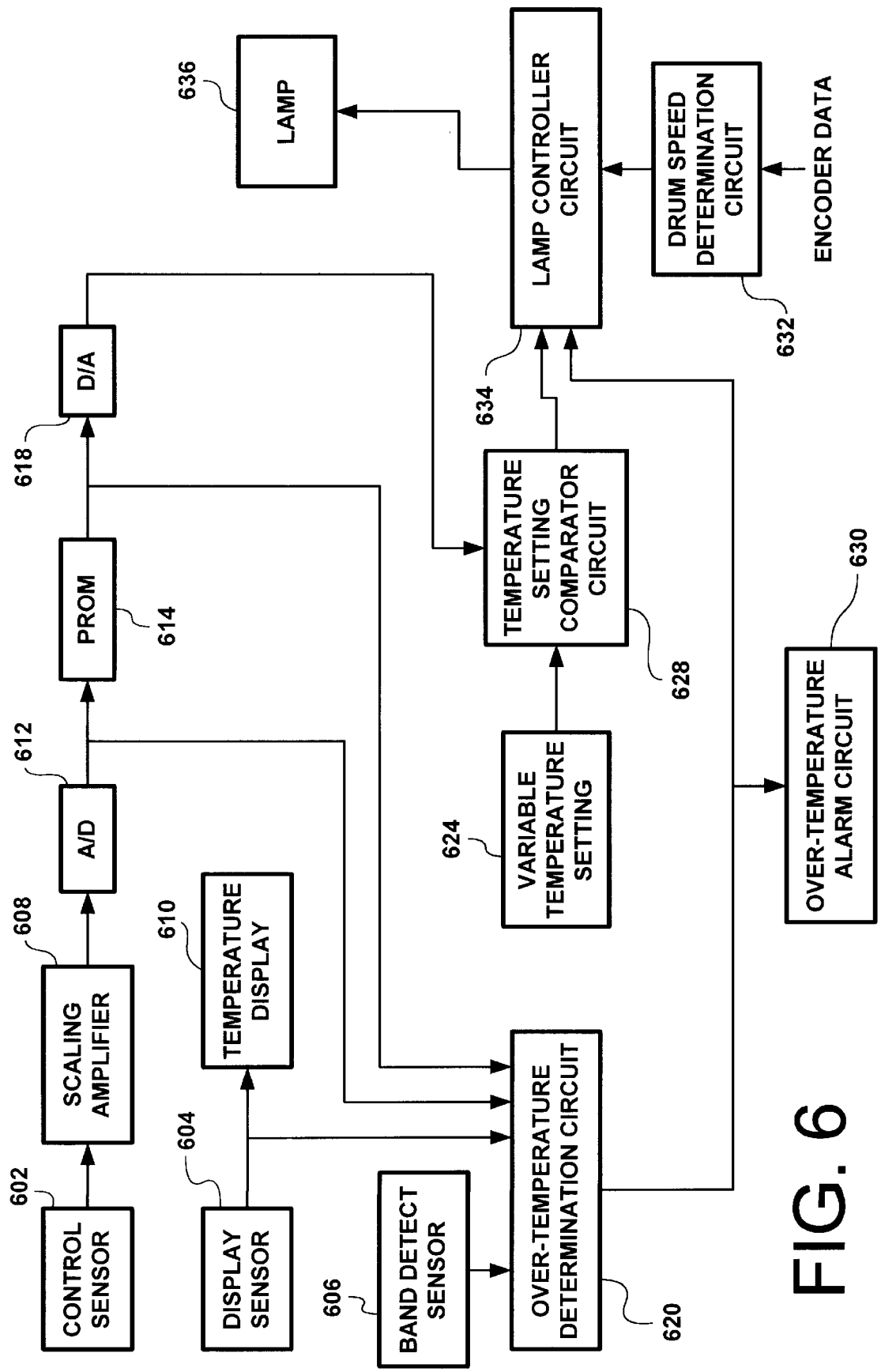
FIG. 6 illustrates a block diagram of a temperature controller according to an embodiment of the present invention.

Referring to FIG. 6, a high level block diagram showing the interaction of various sub-parts of the present invention is illustrated. Inputs to the system are received at three places. Temperature data is acquired by the sensors 602, 604, 606, user input of a variable temperature setting is input via the variable temperature setting circuit 624, and encoder data is received by the drum speed determination circuit 632.

The system according to the present invention has three outputs. The temperature display 610 provides a continuous visual display of the temperature of the hot roll 2. The over-temperature alarm circuit 630 provides an audible alarm in the event that the hot roll becomes excessively hot. A control output signal for controlling the heating lamps 636 that heat the hot roll 2 is provided by lamp controller circuit 634.

Input data regarding the sensed temperature of the hot roll provided by the display sensor 604 is coupled directly to the temperature display circuit 610 for viewing by the user continuously. Temperature input data is also provided by the control sensor 602 to the scaling amplifier 608 prior to being converted into digital form by the analog to digital converter 612.

Once in digital form, the temperature indication signal undergoes a mapping function via the programmable read-only memory (PROM) 614. The resulting mapped temperature signal is then reconverted back into analog form by the digital to analog converter 618. The differences between the pre-mapped signal and the mapped signal are provided exterior of the system to a diagnostic device (not shown) via the port 275 (see FIG. 2).

The digital form of the mapped temperature signal is provided to the over-temperature determination circuit 620 for comparison with the digital form of the temperature indication signal. The analog form of the mapped temperature signal is provided to the temperature setting comparator 628. The temperature setting comparator 628 compares the mapped temperature signal with the variable temperature setting that has been selected by a user via the variable temperature setting circuit 624.

The output of the over-temperature determination circuit 620 is a two-state signal indicating either that an over-temperature status has occurred or that the temperature of the hot roll has not reached the over-temperature threshold. In addition to the digital form of the temperature indication signal and the digital form of the mapped temperature signal, the over-temperature determination circuit 620 also receives the output signals of the display sensor 604 and the band detect sensor 606. The output of the over-temperature comparator 620 is provided to both the over-temperature alarm circuit 630 and to the lamp-controller circuit 634.

The output of the temperature setting comparator 628 is provided only to the lamp controller circuit 634, and is a two-state signal as well, indicating whether the sensed temperature is either above or below the variable temperature setting selected by the user.

The drum speed determination circuit 632 receives encoder data and based on such encoder data makes a determination as to whether the hot roll is being driven at either an active (printing) state speed or in an idle state speed. Depending on that determination, a two-state signal is supplied to the lamp controller circuit 634. The two-state signals provided to the lamp controller circuit 634 from the temperature setting comparator 628, the over-temperature comparator 630, and the drum speed determination circuit 632 are provided, according to a preferred embodiment of the invention, in the form of open or closed switch states of relay contacts. The relays being energized or de-energized based on the output states of the respective driving circuits 620, 628, 632. Based on these three input signals, the lamp controller circuit 634 modulates a pulse signal for providing power to the heating lamps 636t that heat the hot roll 2.

Figure 7:
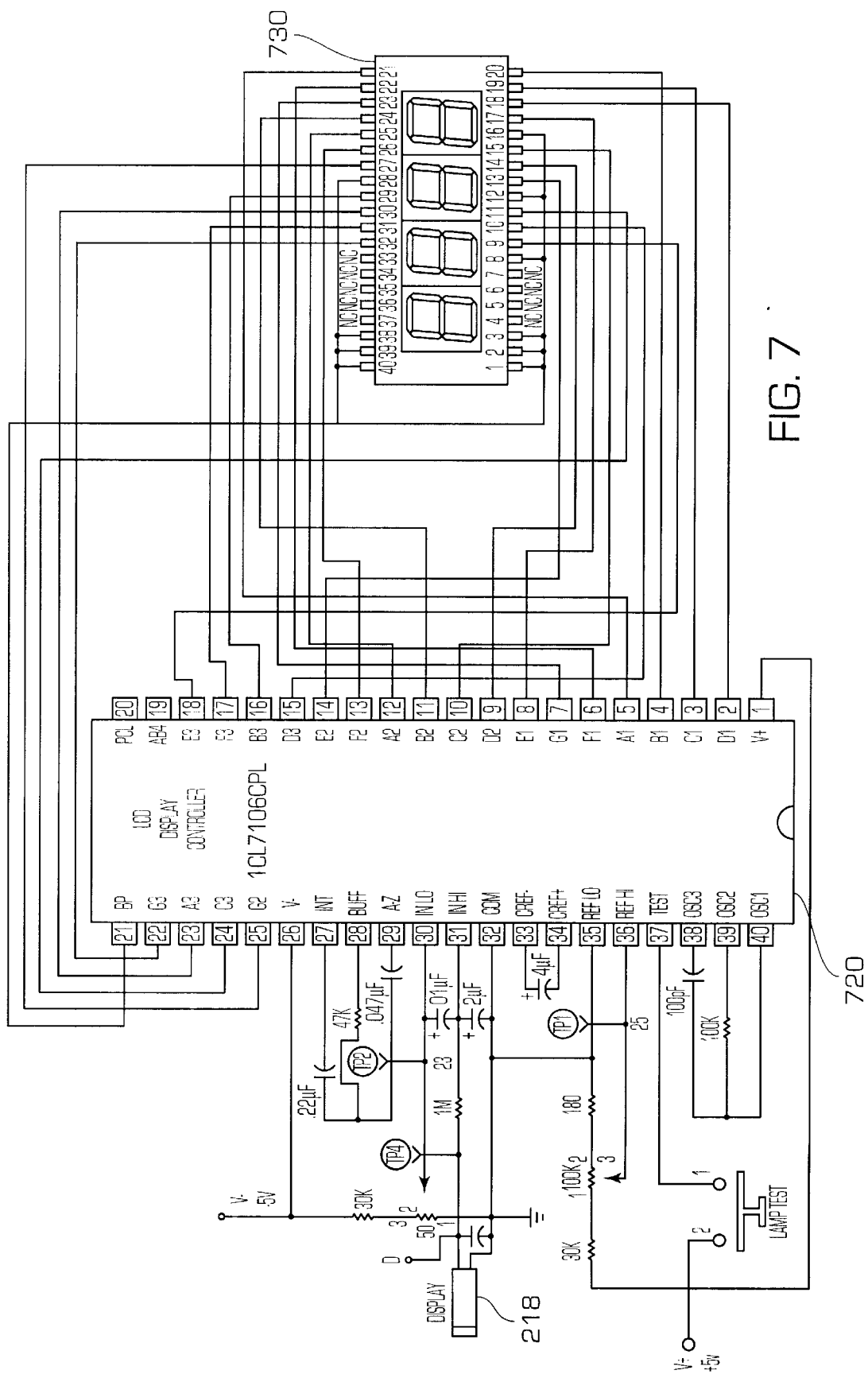
FIG. 7 illustrates a circuit diagram for the Display Sensor and the Temperature Display circuitry of the embodiment of FIG. 6.

Referring to FIG. 7, a preferred circuit for implementing the display sensor 604 and the temperature display circuit 610 is illustrated. The display infrared sensor 218 is labeled "display." The display temperature signal D from the display sensor 218 is provided to an LCD display controller circuit 720, which operates on the input display temperature signal D to drive the bank of seven segment LED displays 730 to provide a visual display of the temperature of the hot roll.

Figure 8:
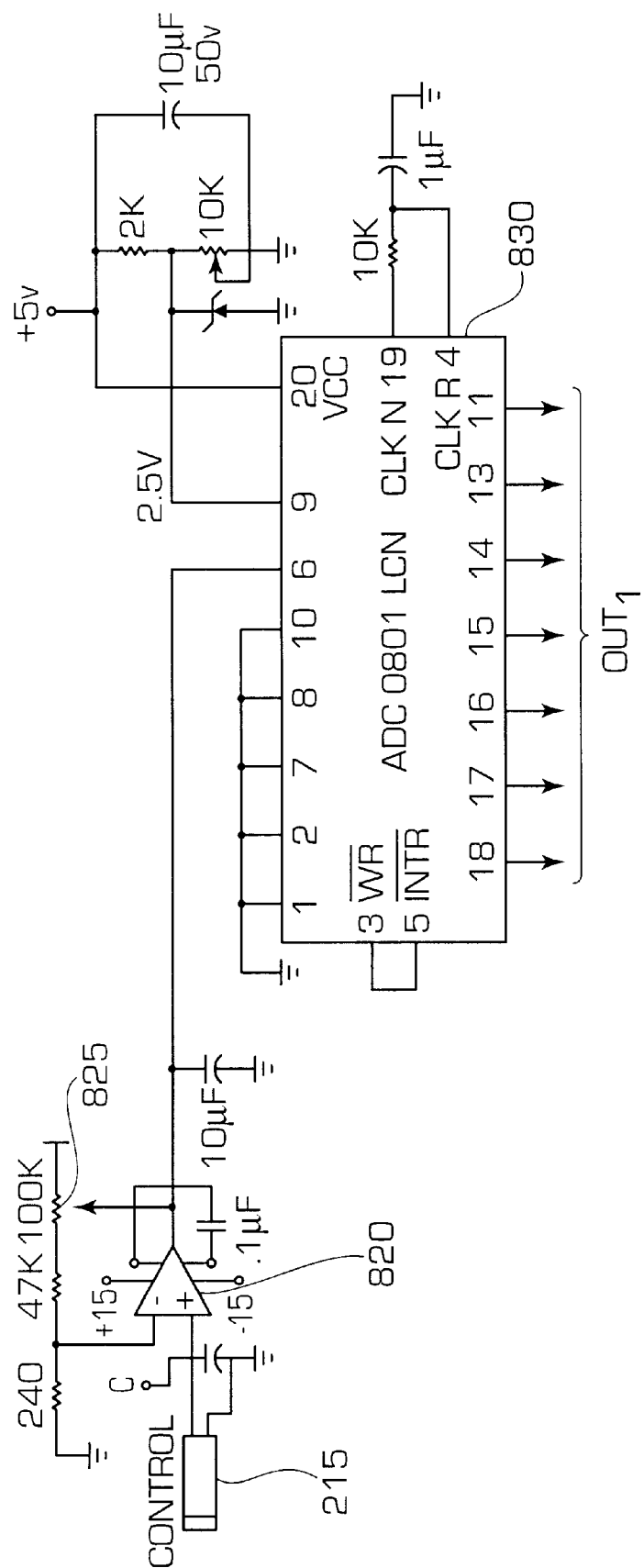
FIG. 8 illustrates a circuit diagram for the Control Sensor, the Scaling Amplifier, and the Analog-to-Digital Converter circuitry of the embodiment of FIG. 6.

Referring to FIG. 8, a preferred circuit for implementing the control sensor 602, the scaling amplifier 608 and the analog to digital converter circuit 612 is illustrated. A temperature indication signal C is provided for amplification by the operational amplifier 820 configured as a scaling amplifier. The gain of the op amp circuit is adjustable via a potentiometer 825 in the feedback path.

The output of the scaling amplifier 608 is then provided to the analog to digital converter chip 830. The conversion circuit 830 provides an eight line parallel digital output $OUT_1$, to the PROM circuit 910. The eight line parallel digital output is also provided to the over-temperature determination circuit 620 and is made available for diagnostic use via a port 275.

Figure 9:
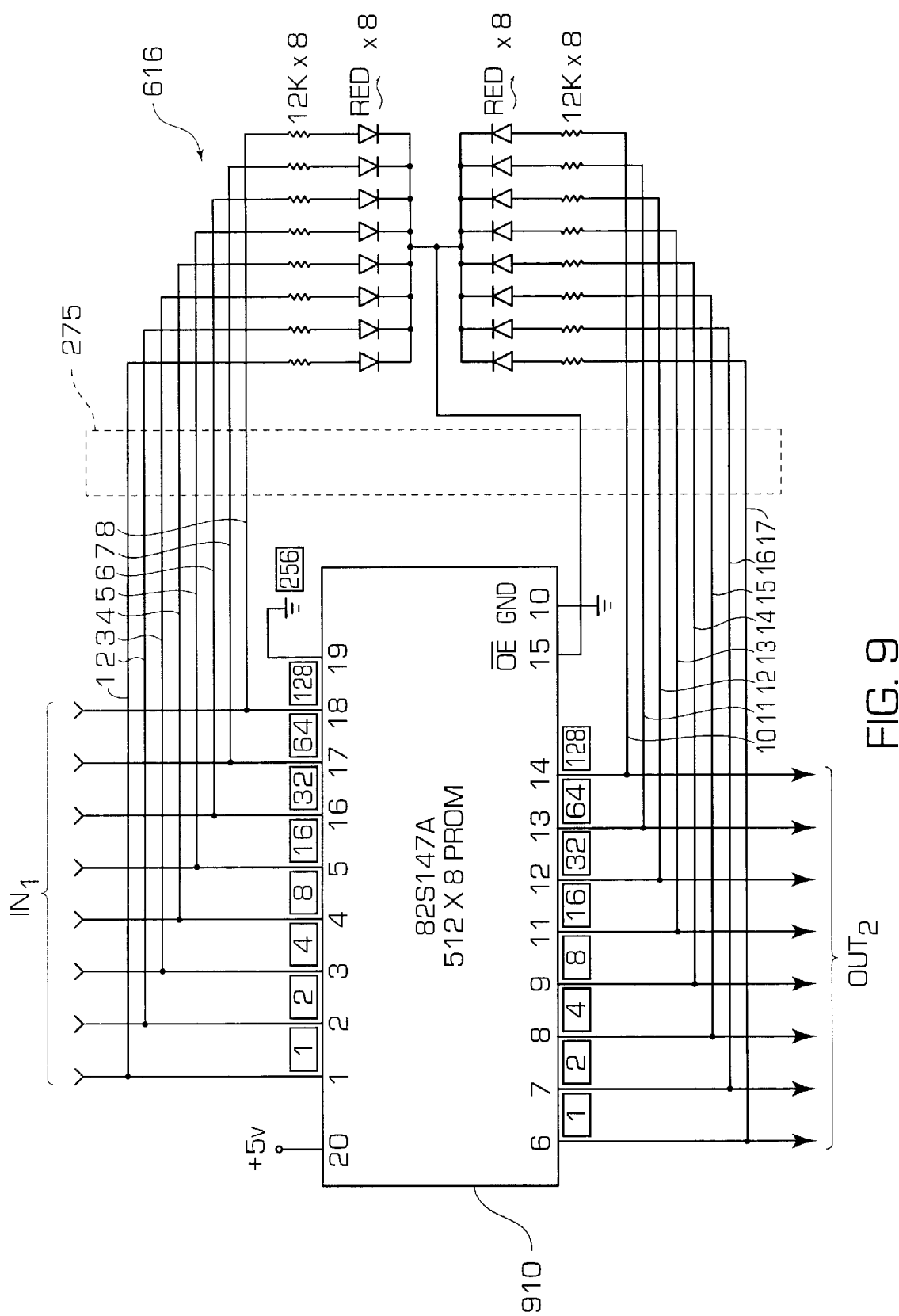
FIG. 9 illustrates a circuit diagram for the Programmable Read Only Memory circuit of the embodiment of FIG. 6, and a Diagnostic Device circuit.

Referring to FIG. 9, the preferred circuit configuration of the PROM circuit 614 and a diagnostic device 616 is illustrated. A 512×8 PROM circuit 910 provides a mapping of the eight line input IN1 (i.e., $OUT_1$ from ADC 612) to an eight line output $OUT_2$. Both the input signal $IN_1$, and output signal $OUT_2$ are provided in parallel to external devices via a port 275. The external device illustrated is a diagnostic device 616 which simply provides a visual display via light emitting diodes of the logic state of the eight input lines and the eight output lines.

Optionally, more elaborate diagnostic equipment may be used. For example, in an alternative embodiment the mapping circuit is embodied as an electronically erasable programmable read only memory (or EEPROM). In such a case, the exterior diagnostic device would naturally be provided with a programming functionality to reprogram the EEPROM. Such programming circuitry is well known to those of skill in the art and may be implemented without difficulty.

Figure 10:
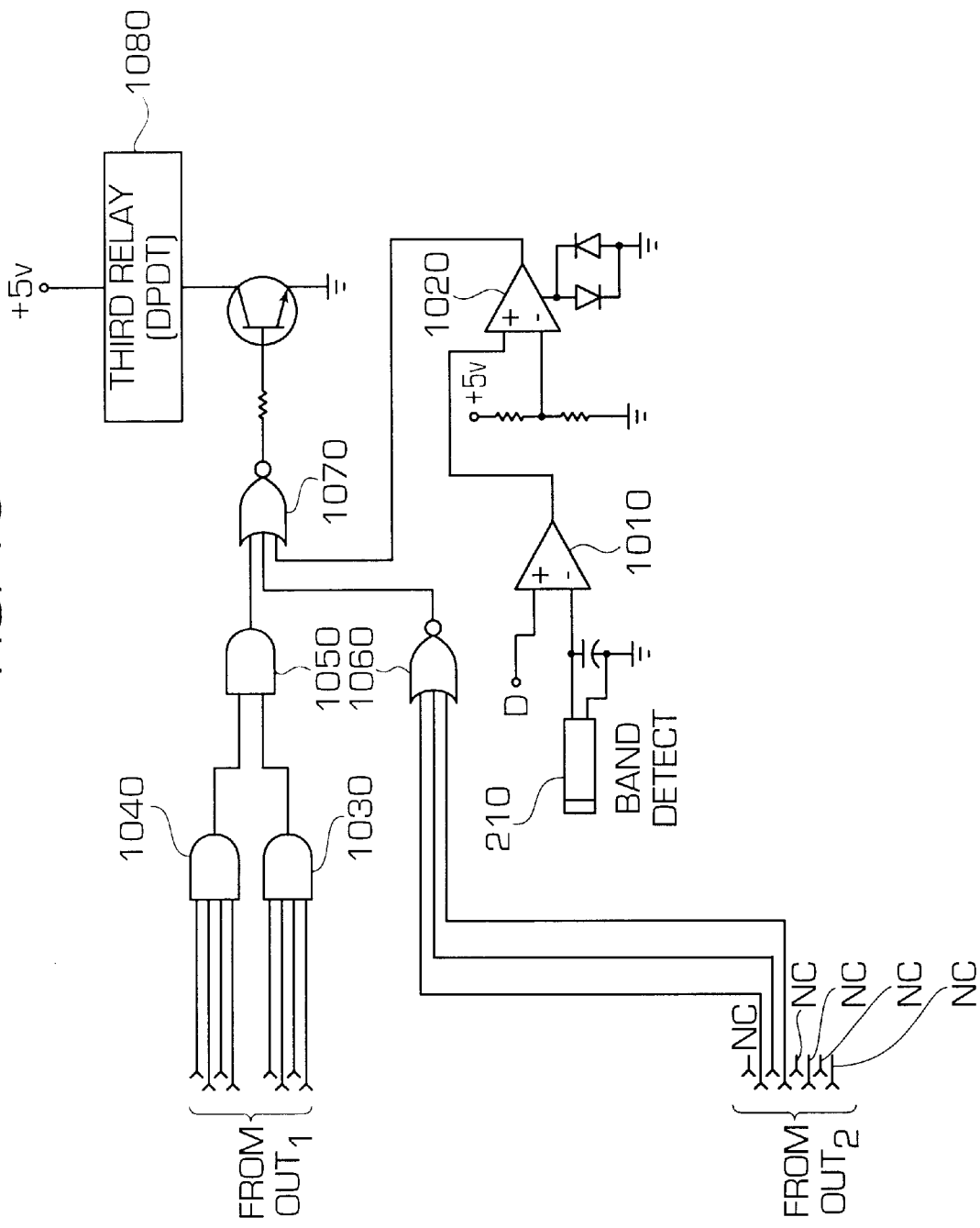
FIG. 10 illustrates a circuit diagram for the Over-Temperature Determination Circuit of the embodiment of FIG. 6.

Referring to FIG. 10, a preferred circuit for implementing the over-temperature determination circuit 620 is illustrated. The temperature indication signal generated by the Band Detect sensor 210 is compared with the temperature indication signal D (from the Display sensor 218) by a first comparator 1010. The output of the first comparator 1010 is compared with a reference voltage by a second comparator 1020.

All eight parallel lines of the $OUT_1$ signal (the digital form of the temperature indication signal), three of the parallel lines of the $OUT_2$ signal (the digital form of the mapped temperature signal), and the two state output of the second comparator 1020 are input to a logic circuit The logic circuit is formed by AND gates 1030, 1040, 1050 and NOR gates 1060, 1070. The two state output of the NOR gate 1070 is coupled so as to selectively energize the Third Relay 1080. The Third Relay 1080 has double-pole-double-throw (DPDT) contacts to provide outputs to other circuits of the invention as described below.

Figure 11:
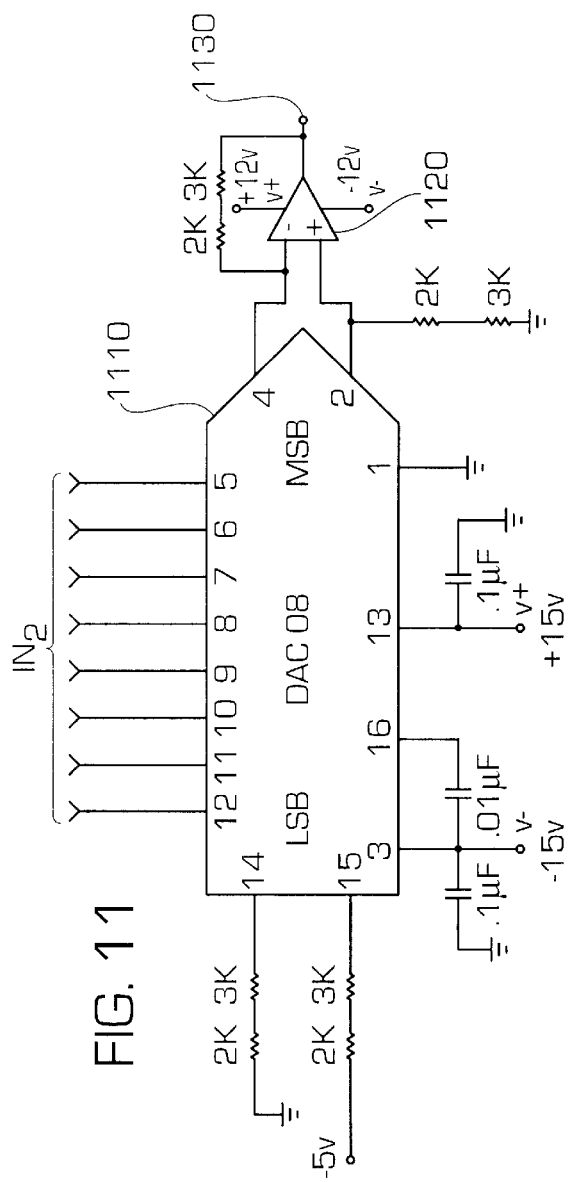
FIG. 11 illustrates a circuit diagram for the Digital-to-Analog Converter circuitry of the embodiment of FIG. 6.

Referring to FIG. 11, a preferred circuit for implementing the digital to analog converter 618 is illustrated. The eight output lines $OUT_2$ from the PROM circuit are received at the eight input lines $IN_2$ of the digital to analog converter chip 1110 and are provided at the differential output to the operational amplifier 1120, which is configured as a differential amplifier circuit. The output of the differential amplifier circuit is provided as an output at node 1130.

Figure 12:
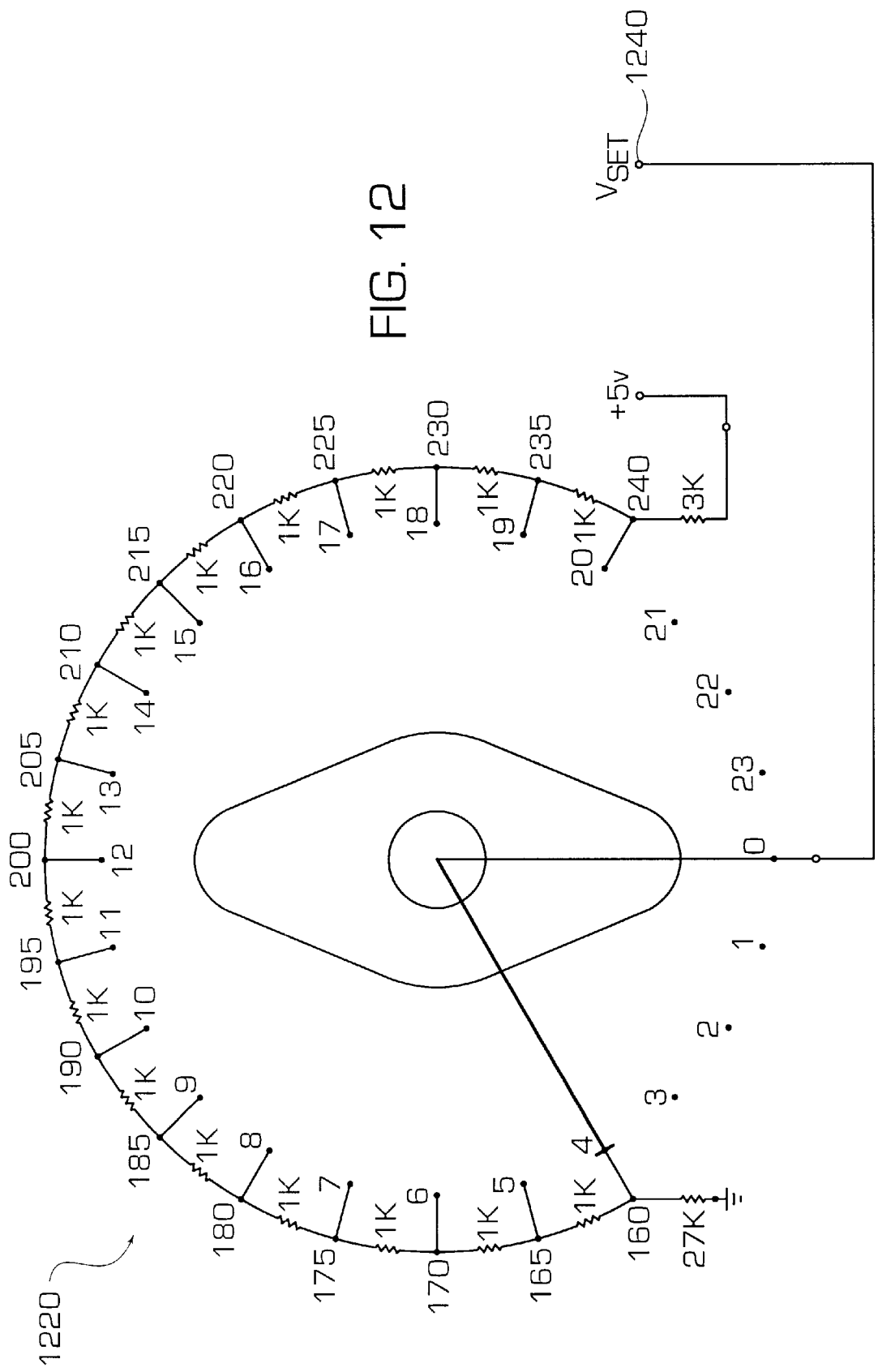
FIG. 12 illustrates a circuit diagram for the Variable Temperature Setting circuit of the embodiment of FIG. 6.

Referring to FIG. 12, a circuit for implementing the Variable Temperature Setting circuit 624 is illustrated. A rotary switch 1220 with resistors between several contacts of the rotary switch provides for a voltage divider with multiple selectable taps. Each position in the rotary switch represents a different temperature setting and provides a different output voltage from the voltage divider. This output voltage setting $V_{SET}$ is provided at node 1240.

Figure 13:
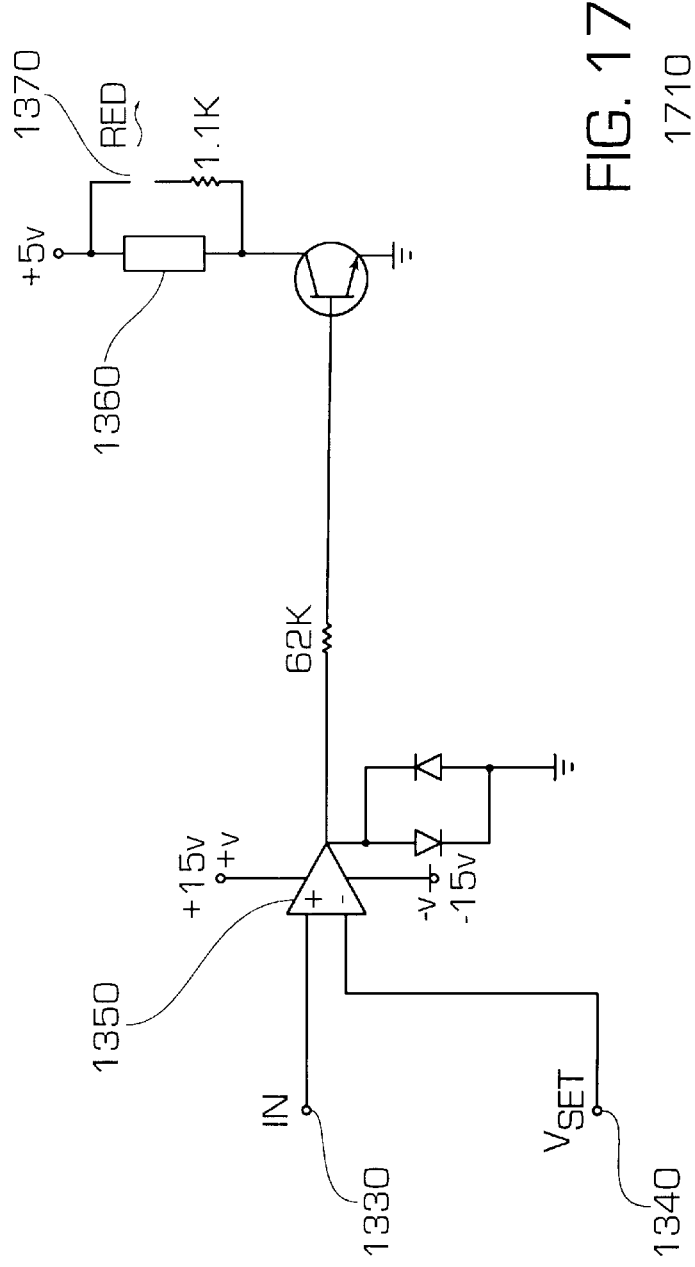
FIG. 13 illustrates a circuit diagram for the Temperature Setting Comparator circuit of the embodiment of FIG. 6.

Referring to FIG. 13, a preferred circuit for implementing the Temperature Setting Comparator circuit 628 is illustrated. The comparator 1350 is used to implement the temperature setting comparator circuit 628. The comparator 1350 receives a non-inverting input, at the input node 1330, received from the output node 1130 of the digital to analog converter circuit. The inverting input of the comparator 1350 receives $V_{SET}$ (the setting voltage) at input node 1340, which is connected to the output node 1240 of FIG. 12. Based on the result of the comparison by the comparator 1350, the output devices, First Relay 1360 and a red LED 1370 are energized or de-energized accordingly. The First Relay 1360 has a single-pole-single-throw (SPST) output contact for providing a two state output to another circuit of the invention as explained below.

Figure 14:
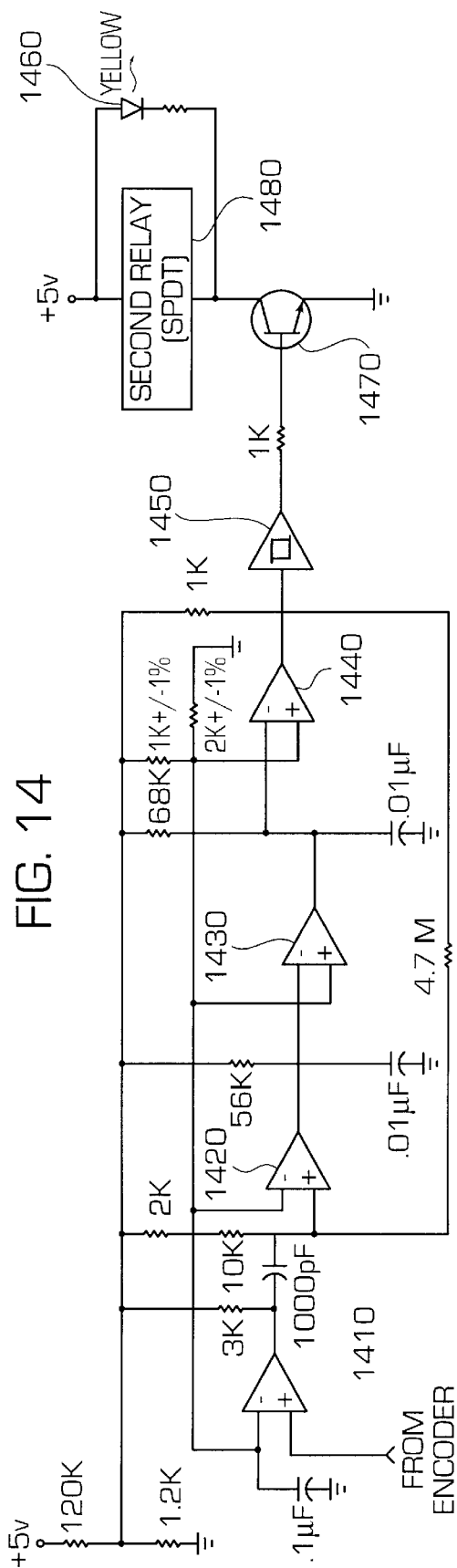
FIG. 14 illustrates a circuit diagram for the Drum Speed Determination Circuit of the embodiment of FIG. 6.

Referring to FIG. 14, a preferred circuit for implementing the drum speed determination circuit 632 according to the present invention is illustrated. A pulse input is received from the encoder at the non-inverting input of operational amp 1410 and is processed by the circuits formed by the four operational amplifiers, 1410, 1420, 1430, 1440 to provide a speed indication signal to a Schmidt trigger device 1450. The output of the Schmidt trigger 1450 selectively biases the switching transistor 1470 to selectively energize the Second Relay 1480, depending upon the speed status of the hot roll. The selective biasing of the switching transistor 1470 by the Schmidt trigger 1450 also selectively energizes a yellow indication LED 1460 depending upon the determined speed of the drum (running or idle). The Second Relay has single-pole-double-throw (SPDT) output contacts for providing two-state outputs to other circuits of the invention as explained below.

Figure 15:
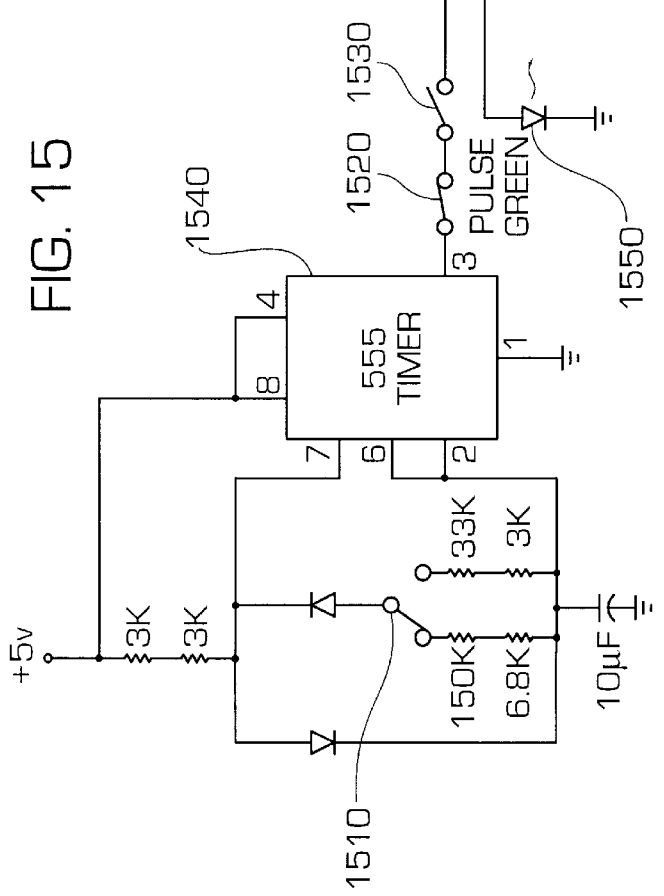
FIG. 15 illustrates a circuit diagram for the Lamp Controller Circuit of the embodiment of FIG. 6.

Referring to FIG. 15, a circuit according to a preferred embodiment of the present invention for implementing the lamp controller circuit 634 is illustrated. Each one of the first relay 1360, the second relay 1480, and the third relay 1380, shown in FIGS. 13 and 14 provide inputs to the lamp controller circuit of FIG. 15. The single pole double throw switch 1510 is a relay switch controlled by the second relay 1480. The single pole single throw switch 1530 is a relay contact controlled by the first relay 1360. The single pole single throw switch 1520 is a first relay contact switch (one of three such contacts) controlled by the third relay 1380.

Each of the three switches, 1510, 1520, 1530, acting as input devices, interact with a timer chip 1540. The switch 1510 controlled by the second relay to indicate speed of the hot roll drum controls the frequency of oscillation of the timer 1540. Both the switches 1520 and 1530, from the third and first relays respectively, act as a logical AND circuit to selectively couple or de-couple the output of the timer 1540 to a pair of output devices. The output devices comprise an electro-optical isolator chip 1560 and a green LED display 1550. The LED display simply provides a visual indication of the state of the lamp control signal. The opto-isolator circuit 1560 couples through a pulse signal to control the energizing of the lamps for heating the hot roll 2.

Figure 16:
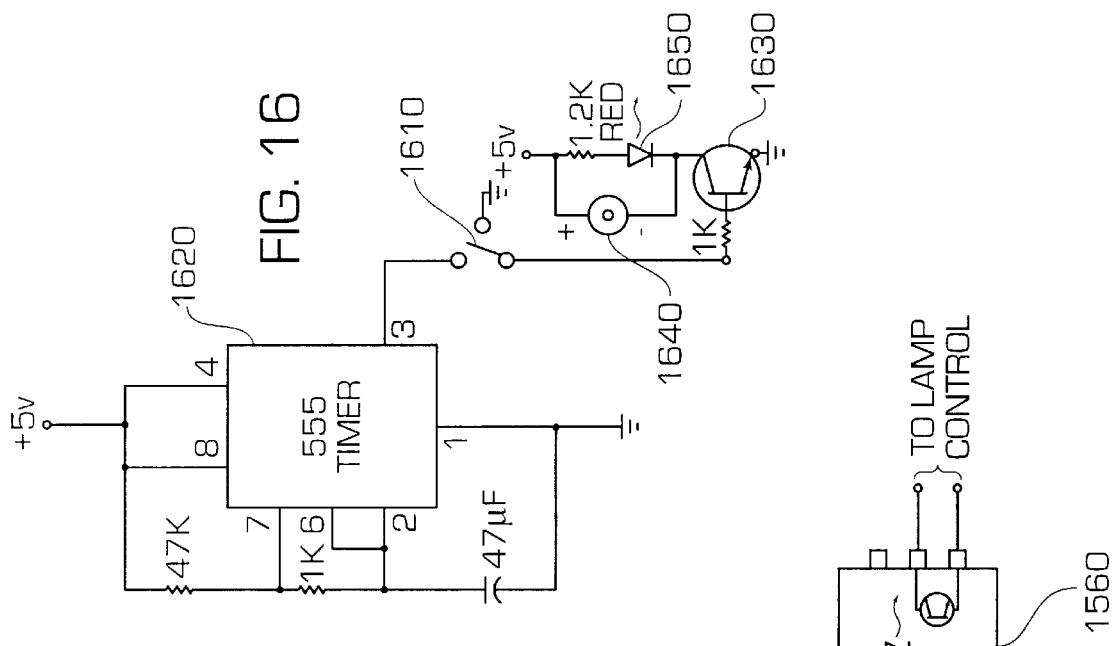
FIG. 16 illustrates a circuit diagram for the Over-Temperature Alarm Circuit of the embodiment of FIG. 6.

Referring to FIG. 16, a preferred circuit configuration for implementing the over-temperature alarm circuit 630 according to the present invention is illustrated. Operative input is provided to the circuit via the DPDT switch 1610 which is a second relay switch contact of the third relay 1380. When the switch 1610 is in one position, the output from pin three of timer device 1620 is coupled to the input of switching transistor 1630. When the switching transistor 1630 is biased ON, both the audible alarm buzzer 1640 and the red LED display 1650 are energized to provide both audible and visual alarm indications. When the switch 1610 is in another position, the output from pin three of timer device 1620 is simply coupled to ground.

Figure 17:
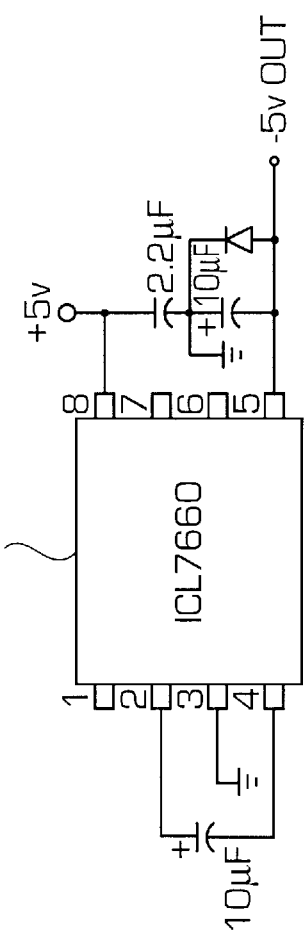
FIG. 17 illustrates a circuit diagram for a negative 5 volt power supply appropriate for use with the Temperature Display circuit of FIG. 8.

Referring to FIG. 17, a circuit configuration is shown for providing a negative 5V power supply for use with the temperature display circuit 610. The integrated circuit (e.g., type ICL 7660) 1710 is provided with a ground level and +5V power supply potentials, from which a −5V output supply is derived according to the circuit shown.

Figure 18:
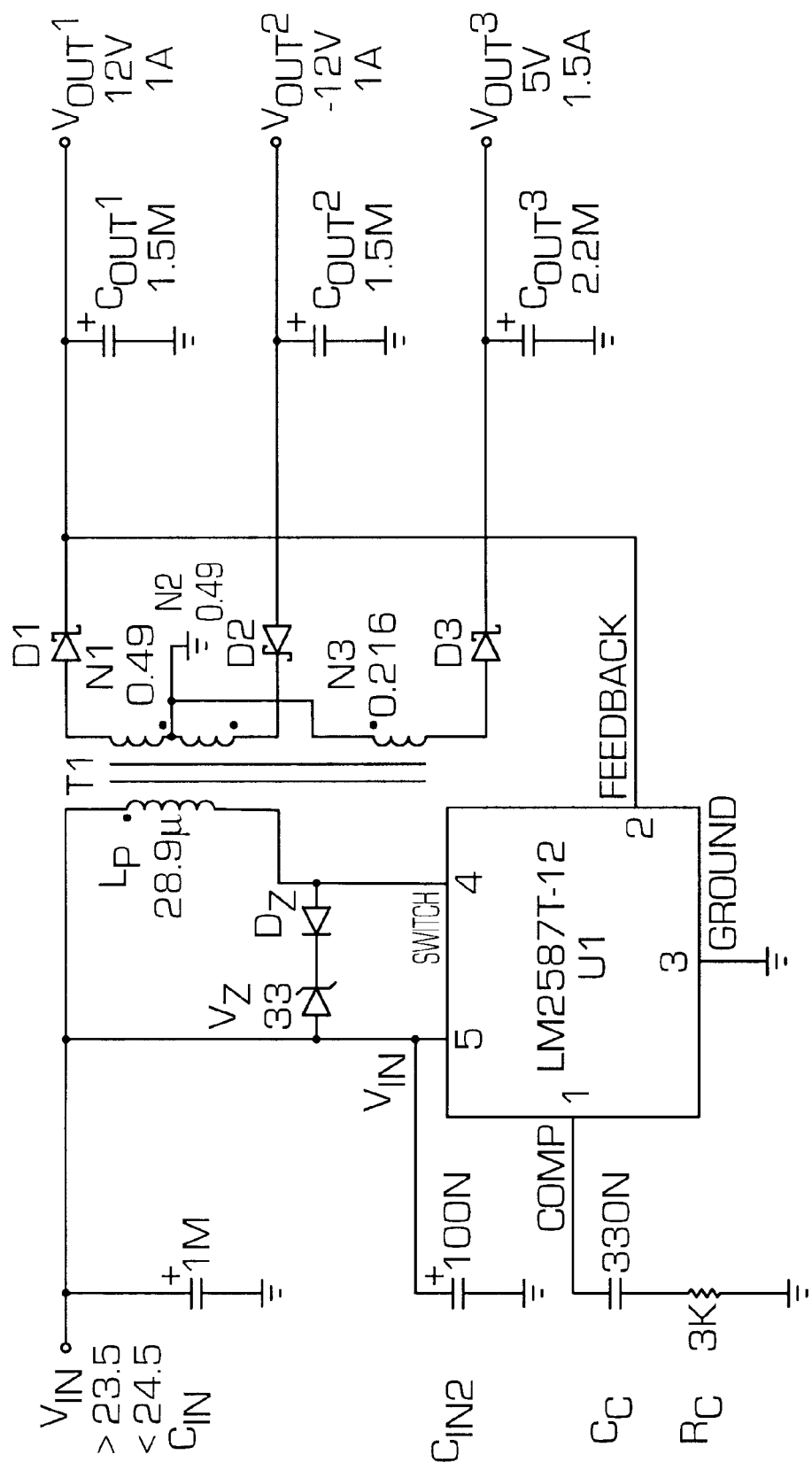
FIG. 18 Illustrates a power supply circuit diagram according to an embodiment of the present invention.

Referring to FIG. 18, a circuit configuration is illustrated to embody the power supply 255 shown in FIG. 2. The design of power supplies is within the level of ordinary skill in the art and, thus, various changes may be made to the circuit illustrated in FIG. 18 without departing from the scope of the invention.

The present invention is currently controlled by hardware circuitry. However, a modification to the design to incorporate a microprocessor and programming features is within the scope of the present invention. The microprocessor, comprising memory, associated with the present invention allows the present invention to store and recall specific settings for any particular print medium on which an image or words are to be printed.

The present invention has been described in terms of preferred embodiments. However, it will be appreciated by those of skill in the art that various modifications and improvements may be made with respect to the described embodiments without departing from the scope of the invention as described. The present invention is limited only by the appended claims.

What is claimed is:

1. A temperature control device for use in controlling temperature of an electrophotographic hot roll, the device comprising:

plural non-contact sensors directed at different parts of the hot roll to generate sensor signals;

a differential amplifier that processes the generated sensor signals to produce a temperature indication signal;

a mapping circuit connected to the differential amplifier so as to perform a mapping function on the temperature indication signal to produce a mapped temperature signal;

a first comparison circuit connected to the mapping circuit so as to receive the mapped temperature signal and compare the mapped temperature signal to a predetermined temperature setting threshold, and produce a comparison result;

a speed determination circuit connected to receive a pulse signal indicative of the rotational speed of the hot roll so as to produce a hot roll speed status signal; and a modulation circuit connected to receive the comparison result from the first comparison circuit and the hot roll speed status signal, causing heating of the hot roll to be modulated so as to maintain the temperature of the hot roll at a temperature corresponding to the predetermined temperature setting threshold.

2. The temperature control device of claim 1, further comprising:

a display circuit connected to receive the temperature indication signal and provide a visual display of temperature of the hot roll.

3. The temperature control device of claim 1, wherein the mapping circuit is a PROM circuit.

4. The temperature control device of claim 1, wherein the mapping circuit is an EEPROM circuit.

5. The temperature control device of claim 1, further comprising:

a second comparison circuit connected to the mapping circuit so as to receive the mapped temperature signal and compare the mapped temperature signal to a predetermined maximum temperature threshold, wherein the second comparison circuit initiates an alarm signal in the event that the mapped temperature signal exceeds the predetermined maximum temperature threshold.

6. The temperature control device of claim 1, wherein one of the non-contact sensors is directed at a portion of the hot roll having a thermally conductive coating, and another of the non-contact sensors is directed to a black body strip on the hot roll.

7. A temperature control device for use in controlling temperature of a heated element, the device comprising:

plural non-contact sensors directed at different parts of the heated element to generate sensor signals;

a differential amplifier that processes the generated sensor signals to produce a temperature indication signal;

a mapping circuit connected to the differential amplifier so as to perform a mapping function on the temperature indication signal to produce a mapped temperature signal;

a first comparison circuit connected to the mapping circuit so as to receive the mapped temperature signal and compare the mapped temperature signal to a predetermined temperature setting threshold, and produce a comparison result;

a speed determination circuit connected to receive a pulse signal indicative of the rotational speed of the heated element so as to produce a speed status signal; and a modulation circuit connected to receive the comparison result from the first comparison circuit and the speed status signal, causing heating of the heated element to be modulated so as to maintain the temperature of the heated element at a temperature corresponding to the predetermined temperature setting threshold.

8. The temperature control device of claim 7, further comprising:

a display circuit connected to receive the temperature indication signal and provide a visual display of temperature of the heated element.

9. The temperature control device of claim 7, wherein the mapping circuit is a PROM circuit.

10. The temperature control device of claim 7, wherein the mapping circuit is an EEPROM circuit.

11. The temperature control device of claim 7, further comprising:

a second comparison circuit connected to the mapping circuit so as to receive the mapped temperature signal and compare the mapped temperature signal to a predetermined maximum temperature threshold, wherein the second comparison circuit initiates an alarm signal in the event that the mapped temperature signal exceeds the predetermined maximum temperature threshold.

12. The temperature control device of claim 7, wherein one of the non-contact sensors is directed at a portion of the heated element having a thermally conductive coating, and another of the non-contact sensors is directed to a black body strip on the heated element.

13. An electrophotographic printing device having a hot roller for fixing images on a recording medium, and having a control circuit for controlling temperature of the hot roller, the control circuit comprising:

plural non-contact sensors directed at different parts of the hot roll to generate sensor signals;

a differential amplifier that processes the generated sensor signals to produce a temperature indication signal;

a mapping circuit connected to the differential amplifier so as to perform a mapping function on the temperature indication signal to produce a mapped temperature signal;

a first comparison circuit connected to the mapping circuit so as to receive the mapped temperature signal and compare the mapped temperature signal to a predetermined temperature setting threshold, and produce a comparison result;

a speed determination circuit connected to receive a pulse signal indicative of the rotational speed of the hot roll so as to produce a hot roll speed status signal; and a modulation circuit connected to receive the comparison result from the first comparison circuit and the hot roll speed status signal, causing heating of the hot roll to be modulated so as to maintain the temperature of the hot roll at a temperature corresponding to the predetermined temperature setting threshold.

14. The electrophotographic printing device of claim 13, further comprising:

a display circuit connected to receive the temperature indication signal and provide a visual display of temperature of the hot roll.

15. The electrophotographic printing device of claim 13, wherein the mapping circuit is a PROM circuit.

16. The electrophotographic printing device of claim 13, wherein the mapping circuit is an EEPROM circuit.

17. The electrophotographic printing device of claim 13, further comprising:

a second comparison circuit connected to the mapping circuit so as to receive the mapped temperature signal and compare the mapped temperature signal to a predetermined maximum temperature threshold, wherein the second comparison circuit initiates an alarm signal in the event that the mapped temperature signal exceeds the predetermined maximum temperature threshold.

18. The electrophotographic printing device of claim 13, wherein one of the non-contact sensors is directed at a portion of the hot roll having a thermally conductive coating, and another of the non-contact sensors is directed to a black body strip on the hot roll.

19. A temperature control device for use in controlling temperature of an electrophotographic hot roll, the device comprising:

plural non-contact sensors directed at different parts of the hot roll to generate sensor signals, wherein one of the non-contact sensors is directed at a portion of the hot roll having a thermally conductive coating, and another of the non-contact sensors is directed to a black body strip on the hot roll;

a differential amplifier that processes the generated sensor signals to produce a temperature indication signal;

a display circuit connected to receive the temperature indication signal and provide a visual display of temperature of the hot roll;

a PROM circuit connected to the differential amplifier so as to perform a mapping function on the temperature indication signal to produce a mapped temperature signal;

a first comparison circuit connected to the PROM circuit so as to receive the mapped temperature signal and compare the mapped temperature signal to a predetermined temperature setting threshold, and produce a comparison result;

a speed determination circuit connected to receive a pulse signal indicative of the rotational speed of the hot roll so as to produce a hot roll speed status signal;

a modulation circuit connected to receive the comparison result from the first comparison circuit and the hot roll speed status signal, causing heating of the hot roll to be modulated so as to maintain the temperature of the hot roll at a temperature corresponding to the predetermined temperature setting threshold; and a second comparison circuit connected to the PROM circuit so as to receive the mapped temperature signal and compare the mapped temperature signal to a predetermined maximum temperature threshold, wherein the second comparison circuit initiates an alarm signal in the event that the mapped temperature signal exceeds the predetermined maximum temperature threshold.

* * * * *